United States Patent
Tanabe et al.

(10) Patent No.: US 6,957,168 B2
(45) Date of Patent: Oct. 18, 2005

(54) PASSENGER DETECTOR AND METHOD OF ADJUSTING THE SAME

(75) Inventors: Takatoshi Tanabe, Ichinomiya (JP); Satoshi Goshima, Tokyo (JP)

(73) Assignees: Denso Corporation, Kariya (JP); Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/654,981

(22) Filed: Sep. 5, 2003

(65) Prior Publication Data

US 2004/0075568 A1 Apr. 22, 2004

(30) Foreign Application Priority Data

Oct. 2, 2002 (JP) .......................................... 2002-289724

(51) Int. Cl.[7] .............................................. G01G 11/00
(52) U.S. Cl. ......................... 702/173; 702/42; 702/101; 702/188
(58) Field of Search .................................. 177/136, 144, 177/25.13; 280/735; 296/65.01; 702/101, 173, 188, 42; 701/45

(56) References Cited

U.S. PATENT DOCUMENTS 6,323,444 B1   11/2001   Aoki
6,609,054 B2 * 8/2003   Wallace ......................... 701/45

FOREIGN PATENT DOCUMENTS

| JP | A-2000-298057 | 10/2000 |
| JP | A-2001-21411 | 1/2001 |
| WO | WO 01/85497 A1 | 11/2001 |

* cited by examiner

*Primary Examiner*—Michael Nghiem
*Assistant Examiner*—Stephen J. Cherry
(74) *Attorney, Agent, or Firm*—Posz Law Group, PLC

(57) ABSTRACT

A passenger detector detects a passenger occupying a seat based on his/her weight. Output signals of the passenger detector are fed to, e.g., an airbag controller so that a degree of inflation of the airbag is controlled according to the output signals of the passenger detector. The passenger detector is composed of an ECU and load sensors for detecting a load imposed on the seat. The ECU includes a ROM in which an original design-target threshold load for detecting a passenger is stored and a rewritable memory such as EEPROM in which a load for adjusting the design-target threshold load according to an actual operation of the load sensors is stored. The adjusting load stored in the rewritable memory is easily renewed by communication with an outside adjusting tool.

16 Claims, 3 Drawing Sheets

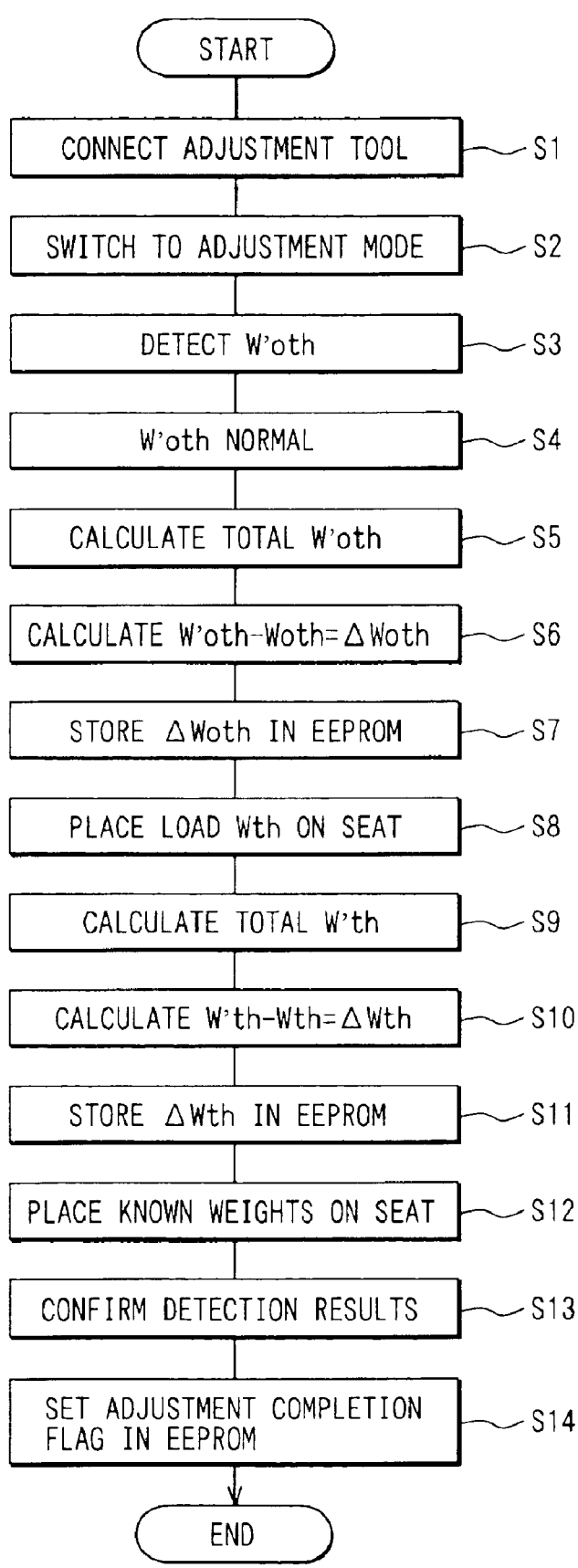

PASSENGER DETECTOR AND METHOD OF ADJUSTING THE SAME

CROSS-REFERENCE TO RELATED APPLICATION

This application is based upon and claims benefit of priority of Japanese Patent Application No. 2002-289724 filed on Oct. 2, 2002, the content of which is incorporated herein by reference.

BACKGROUND OF THE INVENTION

1. Field of the Invention

The present invention relates to a passenger detector for detecting whether a seat of an automobile is occupied by a passenger or not and for detecting a weight of the passenger occupying the seat. The present invention also relates to a method for adjusting such a detector after it is mounted on the seat.

2. Description of Related Art

Various types of the passenger detectors have been known hitherto. One is a detector that detects a passenger's weight imposed on the seat based on pressure changes detected by a pressure sensor installed under the seat. Another one is a detector that uses a pressure-sensitive sheet and a device for measuring a hip size of the passenger. Yet another one is a detector that uses a strain gage installed in the seat. It is necessary for any type of the passenger detectors to adjust or calibrate a zero-weight point or threshold values memorized in the detector for determining a weight of a passenger occupying the seat, because the detector is affected by distortion or strain caused in a process of mounting the detector on the seat.

To cope with the above problem, JP-A-2000-258232 proposes a detector for measuring a passenger's weight on a seat by mechanically absorbing the distortions caused in the process of mounting the detector on the seat. In this detector, a mechanism for absorbing the distortions has to be included in addition to a primary mechanism for measuring the passenger's weight. Therefore, the detector becomes large in size, and it is difficult to install the detector under the seat. In addition, it is difficult to completely absorb the distortions and errors by a solely mechanical manner. Accordingly, it is not easy to realize a high accuracy in the detector.

SUMMARY OF THE INVENTION

The present invention has been made in view of the above-mentioned problem, and an object of the present invention is to provide an improved passenger detector, in which memorized threshold values for determining conditions of seat occupancy are adjustable after the passenger detector is mounted on the seat. Another object of the present invention is to provide a method of adjusting the passenger detector after it is mounted on the seat.

The passenger detector determines whether a seat is occupied and/or a passenger type occupying the seat according to his/her weight. The passenger detector is composed of four load sensors for detecting a load imposed on the seat and an electronic control unit (ECU). The four sensors are installed in the passenger seat, e.g., between seat rails and the seat. The ECU includes a read-only-memory (ROM) and a rewritable non-volatile memory such as EEPROM.

A threshold load for determining whether the seat is occupied is stored in the ROM as a design target. Output levels of the load sensors are shifted from the design target because distortion or strain is caused in the load sensors when they are installed in the seat. To adjust such an output shift, an adjustment process is carried out after the load sensors are installed in the seat and/or after the seat in which the load sensors are installed is mounted on an automobile. An adjustment tool is electrically connected to the ECU of the passenger detector, and a known weight is placed on the seat. A difference between the threshold load stored in the ROM and a load sensor output representing the known weight is detected. The detected difference is stored in the rewritable non-volatile memory. After the adjustment process is completed a flag indicating the completion is set in the rewritable non-volatile memory.

In a process of actually detecting a passenger on the seat, the adjusted threshold load that is obtained in the adjustment process is used. Plural threshold loads, e.g., one corresponding to a vacant seat, another one corresponding to a weight of a child, and yet another one corresponding to a weight of an adult, may be provided. The output signals from the passenger detector are sent to, e.g., a device for controlling operation of an airbag. A degree of inflation of the airbag, for example, is controlled based on the output signals fed from the passenger detector.

The number of the load sensors is not limited to four, but only one or two sensors may be used in the passenger detector. The design-target threshold load is stored in the ROM and the adjustment load is stored in the rewritable memory. Therefore, if the data in the rewritable memory are erased by any chance, the minimum function of the passenger detector can be maintained by the design-target threshold stored in the ROM.

According to the present invention, the design-target threshold load stored in the ROM can be easily adjusted by writing the adjustment value in the rewritable memory through communication with the outside adjustment tool. Other objects and features of the present invention will become more readily apparent from a better understanding of the preferred embodiment described below with reference to the following drawings.

BRIEF DESCRIPTION OF THE DRAWINGS

FIG. 4 is a flowchart showing a process of adjusting the passenger detector after it is installed in a seat.

DETAILED DESCRIPTION OF THE PREFERRED EMBODIMENT

Figure 1:
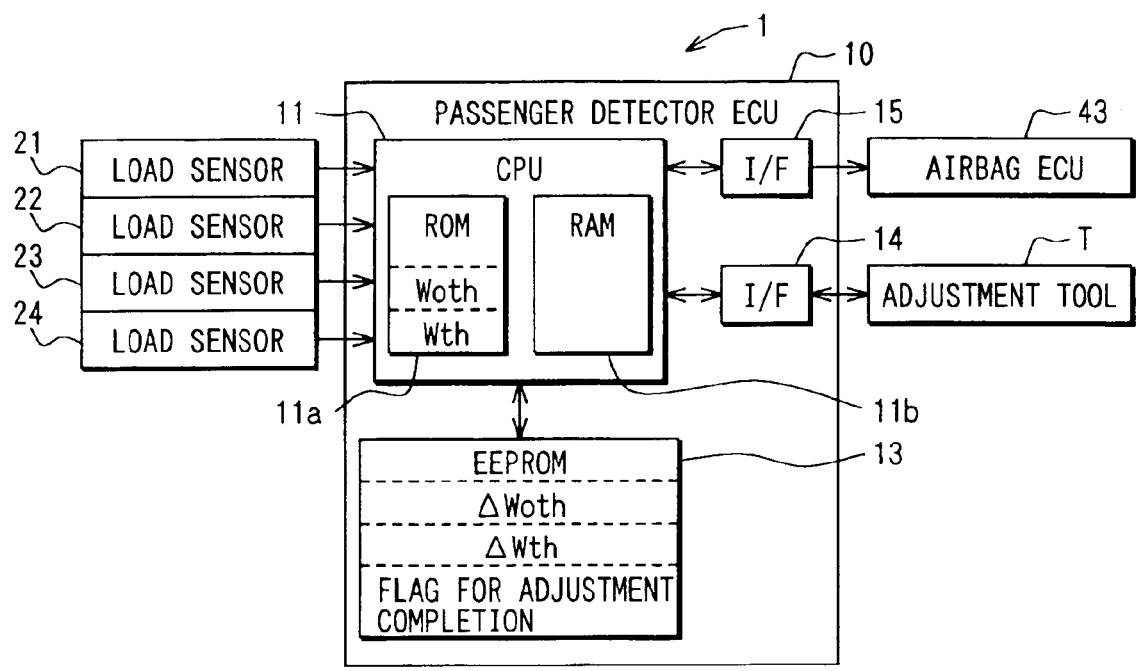
FIG. 1 is a block diagram showing a structure of a passenger detector according to the present invention.
Figure 2:
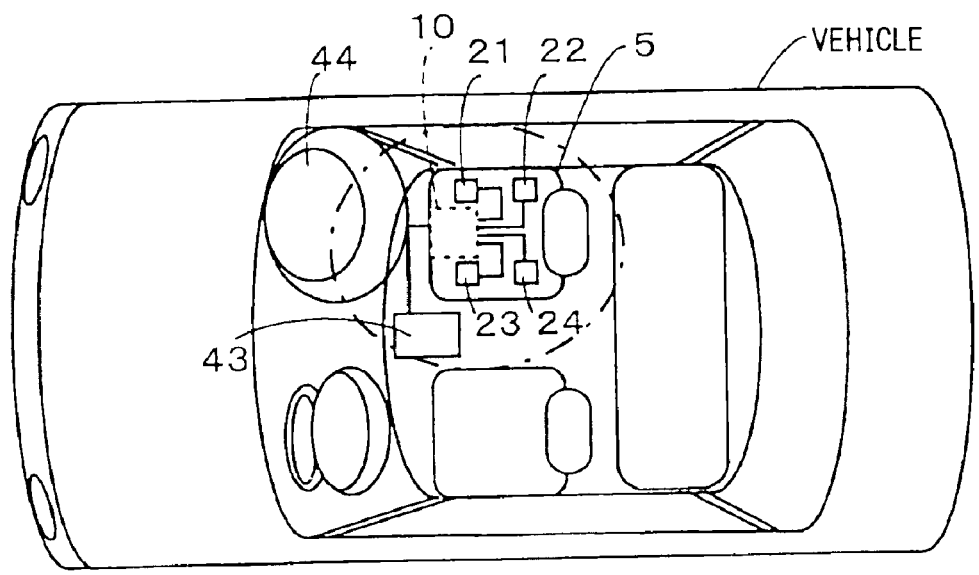
FIG. 2 is a schematic drawing showing where components of the passenger detector are positioned in an automotive vehicle.
Figure 3:
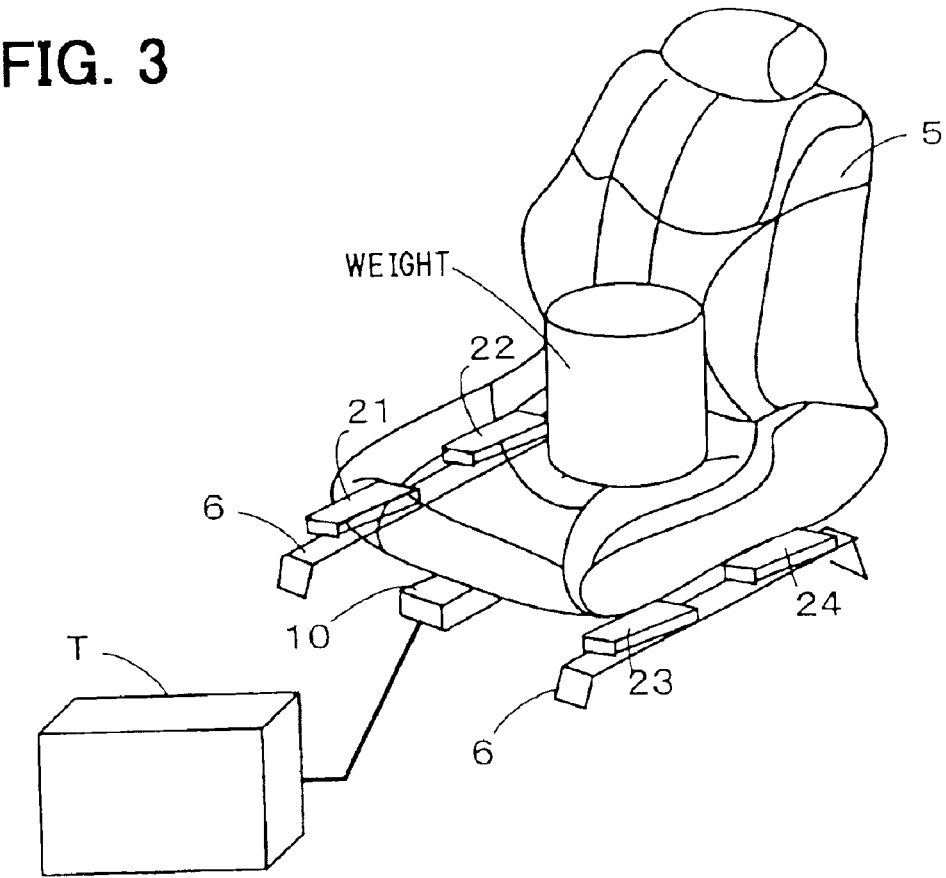
FIG. 3 is a perspective view showing a seat in which the passenger detector is installed and a weight placed on the seat for adjusting the detector.

A preferred embodiment of the present invention will be described with reference to accompanying drawings. As shown in FIG. 1, a passenger detector 1 is composed of four load sensors (each using a strain gage) 21–24 and an ECU (electronic control unit) 10. The ECU 10 is positioned under a seat 5 as shown in FIGS. 2 and 3. The ECU 10 is composed of a CPU (central processing unit) 11, a rewritable non-volatile memory 13, a communication interface 14 for communicating with an adjustment tool T, and another communication interface 15 for communicating with an airbag ECU 43.

Though FIG. 2 shows the passenger detector 1 which is installed under a driver's seat 5, it is possible to install the passenger detector 1 under other seats. Rather, it is preferable to install it under an assistant seat which is possible to be unoccupied, or on which a child would seat.

The CPU 11 is powered by a power source not shown, and is turned on or off in response to turning-on or -off of an ignition key-switch connected to an on-board battery. The CPU 11 includes a mask ROM (read-only-memory) 11*a* and a RAM (random access memory) 11*b*. A program for detecting a passenger stored in the mask ROM 11*a* is read out and put into operation. The mask ROM 11*a* also stores Woth and Wth. Woth denotes a design-target threshold load for determining seat-unoccupancy, and Wth denotes a design-target threshold load for determining seat-occupancy. In other words, Woth is a design-target threshold load corresponding to a weight of the unoccupied seat 5, and Wth is a design-target threshold load for determining a type of a passenger sitting on the seat 5. For example, whether a child occupies the seat 5 or an adult occupies the seat 5 is determined using Wth. An area that is used by the CPU 11 as an working area is secured in the RAM 11*b*.

The EEPROM 13 is a non-volatile memory which is electrically rewritable. An adjusting load $\Delta$Woth for adjusting Woth, and an adjusting load $\Delta$Wth for adjusting Wth are memorized in the EEPROM 13 after both are detected in an adjustment process explained later. That is, an adjusted threshold load W'oth which is used for actually determining the seat-unoccupancy is obtained by adding the adjusting load $\Delta$Woth to the design-target load Woth (i.e., W'oth=Woth +$\Delta$Woth). Similarly, an adjusted threshold load W'th which is used for actually determining the seat-occupancy is obtained by adding the adjusting load $\Delta$Wth to the design-target load Wth (i.e., W'th=Wth+$\Delta$Wth).

The interface 14 is connectable to the adjustment tool T through a communication line. When the CPU 11 is connected to the adjustment tool T via the interface 14, serial communication is performed between the CPU 11 and the adjustment tool T. The interface 15 is connectable to the airbag ECU 43 through a communication line. When the CPU 11 is connected to the airbag ECU 43, results of passenger-detection are sent from the ECU 11 to the airbag ECU 43 via the interface 15.

The load sensors 21–24 are installed at four positions on seat rails 6 disposed under the seat 5, as shown in FIGS. 2 and 3. An area encircled by a chained line in FIG. 2 is shown in FIG. 3. The load sensors 21–24 detect a load imposed on the seat 5 and output electrical signals corresponding to the detected load.

The airbag ECU 43 for controlling operation of an airbag 44 is installed in the vehicle as shown in FIG. 2. The airbag ECU 43 inflates the airbag 44 based on a collision impact detected by a G-sensor (not shown) and passenger information sent from the ECU 10. For example, the airbag 44 is not inflated if the passenger information sent from the ECU 10 indicates that the seat is unoccupied, even if a collision is detected. When the seat is occupied by an adult, the airbag 44 is fully inflated. When the seat is occupied by a child, an amount of the inflation may be suppressed, or the airbag 44 may not be inflated at all.

The adjustment tool T is prepared, separately from the passenger detector 1, for adjusting the design-target loads Woth and Wth stored in the ROM 11*a*. The adjustment tool T is connected to the communication interface 14 through a communication line when an adjustment process is carried out. The adjustment tool T includes a CPU, a ROM, a RAM, a keyboard and other associated components. An adjustment program stored in the ROM is read out by the CPU in the adjustment process, and the adjusting loads $\Delta$Woth and $\Delta$Wth are written in the EEPROM 13, or those already stored in the EEPROM 13 are rewritten through the communication line.

Now, a process of adjusting the design-target loads Woth and Wth will be described with reference to the flowchart shown in FIG. 4. This process is performed after the load sensors 21–24 are installed in the seat 5 and/or after the seat 5 in which the load sensors 21–24 are installed is mounted on the automobile.

First, at step S1, the adjustment tool T is electrically connected to the communication interface 14 of the passenger detector ECU 10. Then, at step S2, the ECU 10 is brought into an adjustment mode by sending a command from the adjustment tool T. The ECU 10 is usually in a detection mode under which the passenger on the seat is actually detected. The ECU 10 is brought into the adjustment mode when the data stored in the EEPROM 13 are rewritten for adjusting the passenger detector 1.

At step S3, each load sensor 21–24 detects a load imposed on the unoccupied seat 5, and the results of the detection are displayed on a display panel of the adjusting tool T. At step S4, whether the results of the detection are within a normal range is confirmed. If the detection results are out of the normal range, it may be determined that a load sensor showing an abnormal detection result is detrimental. At step S5, a total amount of the detection values sent from each load sensor 21–24 is calculated. The total amount is denoted as W'oth, which is also referred to as an adjusted threshold load for determining seat-unoccupancy. At step S6, a difference $\Delta$Woth between Woth stored in the ROM 11*a* and W'oth is calculated ($\Delta$Woth=W'oth–Woth). At step S7, the calculated $\Delta$Woth is stored in the EEPROM 13 by sending a command from the adjustment tool T to the ECU 10.

Then, at step S8, a weight corresponding to Wth (the design-target threshold load for determining seat-occupancy) is placed on the seat 5, as shown in FIG. 3. At step S9, outputs from four load sensors 21–24 are totaled to obtain a total amount of load W'th. W'th is referred to as an adjusted threshold load for determining seat-occupancy. At step S10, a difference $\Delta$Wth between Wth stored in the ROM 11*a* and W'th is calculated ($\Delta$Wth=W'th–Wth). At step S1, the calculated $\Delta$Wth is stored in the EEPROM 13 by sending a command from the adjustment tool T to the ECU 10.

Then, at step S12, various weights each having a known weight are placed on the seat 5, and output signals from the ECU 10 are received by the adjusting tool T and displayed on its display panel. At step S13, whether the passenger detector 1 correctly operates is determined. In determining that the seat 5 is unoccupied, a sum of Woth and $\Delta$Woth (i.e., W'oth) is used. In determining that the seat 5 is occupied, a sum of Wth and $\Delta$Wth (i.e., W'th) is used. Finally, at step S14, a flag indicating completion of adjustment is set in the EEPROM 13.

As described above, if actual outputs of the passenger detector 1 are shifted from the original design-target levels due to distortions or strains of the load sensors 21–24, which are caused in the process of mounting the passenger detector 1 on the seat 5 and/or in the process of mounting the seat 5 in which the passenger detector 1 is installed on the automotive vehicle, the shifted outputs can be easily adjusted by performing the adjusting process. That is, the design-target loads Woth and Wth stored in the mask ROM 11*a* are calibrated or adjusted by $\Delta$Woth and $\Delta$Wth written in the EEPROM 13. The adjustment process is carried out after the passenger detector 1 is installed in the seat 5, and/or after the seat 5 in which the passenger detector 1 is installed is mounted on the automobile. Therefore, the passenger detector 1 correctly operates without fail.

In order to determine whether the seat 5 is occupied by a child or an adult, two Wth values are stored in the ROM 11a and adjusted by respective ΔWth values written in the EEPROM 13. The number of Wth values are not limited to two, but more than two values may be used for determining various types of passengers on the seat.

Since the data stored in the EEPROM 13 are rewritable by communicating with an outside adjustment tool T, the adjusting data ΔWoth and ΔWth can be easily changed. If the adjusting data ΔWoth and ΔWth memorized in the EEPROM 13 disappear or are erased by any chance, the minimum requirements to the passenger detector 1 can be satisfied by using the design-target loads Woth and Wth stored in the mask ROM 11a. Since the flag indicating the adjustment completion is set in the EEPROM 13, whether the adjustment is completed or not is easily checked in any later process. For example, should an accident or any malfunction occur later, the flag indicating the adjustment completion can be referred to in analyzing causes of the accident or the malfunction.

The passenger detector 1 is installed in the seat 5 in a plant of a seat manufacturer, for example. Then, the seat 5 in which the passenger detector 1 is installed is mounted on the automobile in an assembling line of an automobile manufacturer. Further, the seat 5 may be replaced with a new one at a dealer of the automobile if the seat 5 is damaged by an accident. After any change is made to the seat 5, the adjustment of the passenger detector 1 is performed, rewriting the adjustment data ΔWoth and ΔWth stored in the EEPROM 13. Every time the adjustment is completed, a respective flag is set in a respectively different address in the EEPROM 13. Thus, these flags are referred to in the later processes for analyzing defects in the passenger detector 1.

The present invention is not limited to the embodiment described above, but it may be variously modified. For example, though the detection results of the passenger detector 1 are sent to the airbag ECU 43 in the foregoing embodiment, it is also possible to send the detection results to other passenger-protecting devices such as a controller for controlling a seat belt having a pre-tensioner. The communication interface 14 may be eliminated, and the adjustment tool T may be connected to the CPU 11 via another communication interface such as the one for the airbag ECU.

The outputs of the load sensors 21–24 may be individually adjusted or adjusted as a whole as done in the foregoing embodiment. The number of the load sensors is not limited to four, but it may be possible to use only one or two of them. Though the design-target loads Woth and Wth are memorized in the mask ROM 11a and the adjustment loads ΔWoth and ΔWth are written in the EEPROM 13 in the foregoing embodiment, it is possible to store the adjusted loads W'oth (=Woth+ΔWoth) and W'th (=Wth+ΔWth) in the EEPROM 13. In this case, the passenger detector 1 determines seat-occupancy or unoccupancy solely based on the data stored in the EEPROM. However, should the data stored in the EEPROM be erased by any chance, the minimum functions of the passenger detector 1 can be performed based on the design-target loads stored in the mask ROM 11a.

According to the present invention, the loads ΔWoth and ΔWth for adjusting the design-target loads Woth and Wth are written in the rewritable memory. Therefore, the adjustment loads ΔWoth and ΔWth are easily rewritten from outside of the passenger detector 1 through communication. This process of rewriting the adjustment loads (the adjustment process) is carried out after the passenger detector 1 is installed in the seat 5 and/or after the seat 5 in which the passenger detector 1 is installed is mounted on the automobile by placing known weights on the seat 5. Therefore, any possible distortion in the load sensors caused in the process of assembling or mounting can be calibrated by performing the adjustment process. Accordingly, the passenger detector 1 can correctly determine whether the seat 5 is occupied or not and a passenger type according to his/her weight.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A passenger detector for detecting a passenger occupying a seat of an automotive vehicle, the passenger detector comprising:

a load sensor for detecting a load imposed on the seat;

a memory for storing at least one threshold load, the memory including a rewritable non-volatile memory; and means for determining occupancy or unoccupancy of the seat by comparing the load detected by the load sensor with the memorized threshold load, wherein:

the memory further includes a read-only-memory;

the read-only-memory stores design-target threshold loads and the rewritable non-volatile memory stores adjustment loads for adjusting the design-target threshold loads; and the adjusted threshold loads, which are obtained by adjusting the design-target threshold loads with the adjustment loads, are used for determining occupancy or unoccupancy of the seat.

2. The passenger detector as in claim 1, wherein:

data stored in the rewritable non-volatile memory are renewable by communication with an outside device.

3. The passenger detector as in claim 1, wherein:

the threshold load includes data for determining a passenger type according to his/her weight.

4. The passenger detector as in claim 1, wherein: the threshold load includes data for determining the unoccupancy of the seat.

5. A passenger detector, for detecting a passenger occupying a seat of an automotive vehicle, the passenger detector comprising:

a load sensor for detecting a load imposed on the seat;

a memory for storing at least one threshold load, the memory including read-only-memory for storing design-target threshold loads and a rewritable non-volatile memory for storing adjustment loads for adjusting the design-target threshold loads; and means for determining occupancy or unoccupancy of the seat by comparing the load detected by the load sensor with the memorized threshold load, wherein:

the rewritable non-volatile memory further stores a flag indicating that the adjustment loads have been stored or rewritten.

6. The passenger detector as in claim 5, wherein:

data stored in the rewritable non-volatile memory are renewable by communication with an outside device.

7. The passenger detector as in claim 5, wherein:
the threshold load includes data for determining a passenger type according to his/her weight.

8. The passenger detector as in claim 5, wherein:
the threshold load includes data for determining the unoccupancy of the seat.

9. A method of adjusting a passenger detector for detecting a passenger occupying a seat of an automotive vehicle, the passenger detector including a load sensor for detecting a load imposed on the seat and a memory for storing a threshold load for determining occupancy of unoccupancy of the seat by comparing the load detected by the load sensor with the threshold load stored in the memory, the method comprising steps to be carried out in the following order:
installing the passenger detector in the seat;
placing a known load on the seat;
measuring the known load by the load sensor to thereby obtain a detected load; and
adjusting the threshold load stored in the memory using the detected load.

10. The method of adjusting a passenger detector as in claim 9, the method further including a step of mounting the seat in which the passenger detector is installed on the automotive vehicle, this step being carried before the step of placing the known load on the seat.

11. The method of adjusting a passenger detector as in claim 9, wherein:
the threshold load stored in the memory includes data for determining a passenger type according to his/her weight;
the known load placed on the seat is a load corresponding to a design-target threshold load; and
the threshold load is adjusted based on a result of measuring the known load.

12. The method of adjusting a passenger detector as in claim 11, wherein:
the threshold load stored in the memory further includes data for determining unoccupancy of the seat; and
the data for determining unoccupancy of the seat is adjusted based on a load detected by the load sensor without placing any load on the seat.

13. The method of adjusting a passenger detector as in claim 9, wherein:
the memory includes a rewritable non-volatile memory; and
the adjustment of the threshold load is carried out by rewriting data stored in the rewritable non-volatile memory.

14. The method of adjusting a passenger detector as in claim 13, wherein:
the data stored in the rewritable non-volatile memory are rewritten through communication between the passenger detector and an outside device.

15. The method of adjusting a passenger detector as in claim 13, wherein:
the memory further includes a read-only-memory in which a design-target threshold load is stored; and
a difference between the load detected by the load sensor by measuring the known load and the design-target threshold load is written in the rewritable non-volatile memory, thereby adjusting the design-target load with the difference.

16. The method of adjusting a passenger detector as in claim 15, wherein:
the rewritable non-volatile memory further stores a flag indicating that the difference for adjustment has been written in the rewritable non-volatile memory.

* * * * *